United States Patent
Irie et al.

(10) Patent No.: US 8,428,656 B2
(45) Date of Patent: Apr. 23, 2013

(54) MULTI-MODE TERMINAL DEVICE

(75) Inventors: Akiko Irie, Tokyo (JP); Takayuki Yoshihara, Tokyo (JP); Tetsuya Miyakawa, Tokyo (JP); Yasushi Tachibana, Tokyo (JP); Takayuki Orii, Sagamihara (JP); Takeshi Natsuno, Tokyo (JP); Tomohiro Ando, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 523 days.

(21) Appl. No.: 12/442,591

(22) PCT Filed: Sep. 20, 2007

(86) PCT No.: PCT/JP2007/068244
§ 371 (c)(1),
(2), (4) Date: Nov. 17, 2009

(87) PCT Pub. No.: WO2008/038558
PCT Pub. Date: Apr. 3, 2008

(65) Prior Publication Data
US 2011/0098089 A1    Apr. 28, 2011

(30) Foreign Application Priority Data

Sep. 26, 2006   (JP) ................................ 2006-260649

(51) Int. Cl.
*H04B 1/38* (2006.01)
*H04M 3/42* (2006.01)
(52) U.S. Cl.
USPC .......................................... 455/565; 455/415
(58) Field of Classification Search .................. 455/565, 455/566, 567, 415
See application file for complete search history.

(56) References Cited

U.S. PATENT DOCUMENTS

| | | | | |
|---|---|---|---|---|
| 5,838,777 | A | * | 11/1998 | Chang et al. .................. 379/352 |
| 6,385,466 | B1 | * | 5/2002 | Hirai et al. .................... 455/566 |
| 6,836,652 | B2 | | 12/2004 | Arima et al. |
| 7,133,859 | B1 | * | 11/2006 | Wong ................................. 1/1 |
| 7,941,183 | B2 | * | 5/2011 | Yomoda ..................... 455/556.2 |
| 2002/0034930 | A1 | * | 3/2002 | Yamazaki et al. .............. 455/90 |

(Continued)

FOREIGN PATENT DOCUMENTS

| EP | 0526981 A2 | 2/1993 |
|---|---|---|
| JP | 11234193 A | 8/1999 |

(Continued)

OTHER PUBLICATIONS

Notice of Final Rejection on the corresponding JP Application No. 2006-260649.

(Continued)

*Primary Examiner* — Christopher M Brandt
(74) *Attorney, Agent, or Firm* — Michaud-Kinney Group LLP

(57) ABSTRACT

A mobile terminal device of the invention is a mobile terminal device capable of placing and receiving calls by first identification information, and of placing and receiving calls by second identification information, and is characterized by having a mode changing section that changes a mode among a first mode, a second mode and a common mode, and an outgoing call control section which places a call by the first identification information in the first mode, places a call by the second identification information in the second mode, and places a call by either the first identification information or the second identification information in the common mode.

8 Claims, 13 Drawing Sheets

U.S. PATENT DOCUMENTS

| | | | |
|---|---|---|---|
| 2003/0153337 A1* | 8/2003 | Ito | 455/517 |
| 2004/0203661 A1* | 10/2004 | Lee | 455/414.1 |
| 2004/0253963 A1* | 12/2004 | Park et al. | 455/456.2 |
| 2005/0048930 A1 | 3/2005 | Arimitsu | |
| 2005/0227743 A1 | 10/2005 | Kubo | |
| 2005/0260975 A1* | 11/2005 | Chen et al. | 455/415 |
| 2006/0046786 A1* | 3/2006 | Montebovi et al. | 455/566 |
| 2006/0073816 A1* | 4/2006 | Kim et al. | 455/414.1 |
| 2006/0172779 A1* | 8/2006 | Yoshida | 455/567 |
| 2007/0072648 A1* | 3/2007 | Stoops | 455/566 |
| 2007/0103434 A1* | 5/2007 | Lian et al. | 345/156 |
| 2007/0111714 A1* | 5/2007 | Edwards | 455/415 |
| 2008/0070553 A1* | 3/2008 | Yamakawa et al. | 455/413 |

FOREIGN PATENT DOCUMENTS

| | | | |
|---|---|---|---|
| JP | 2000261545 A | 9/2000 | |
| JP | 2001045136 A | 2/2001 | |
| JP | 2003189013 A | 7/2003 | |
| JP | 2003189361 A | 7/2003 | |
| JP | 2004-007054 | 1/2004 | |
| JP | 2004120788 A | 4/2004 | |
| JP | 2005072931 A | 3/2005 | |
| JP | 2005-184539 | 7/2005 | |
| JP | 2005204226 A | 7/2005 | |
| JP | 2005210306 A | 8/2005 | |
| JP | 2005252610 A | 9/2005 | |
| JP | 2005348233 A | 12/2005 | |
| JP | 2006014008 A | 1/2006 | |
| JP | 2006014355 | 1/2006 | |
| JP | 2006121334 A | 5/2006 | |
| JP | 2006121335 A | 5/2006 | |
| JP | 2006121336 A | 5/2006 | |
| KR | 2000-0074880 | * | 12/2000 |
| KR | 10-2005-0052795 | * | 12/2003 |
| WO | 2004019637 | 3/2004 | |

OTHER PUBLICATIONS

Korean Office Action issued on corresponding Korean Patent Application No. 10-2009-7008410, dated Jan. 2, 2011.

Supplementary European Search Report dated Sep. 28, 2011 (28 Sep. 20110).

\* cited by examiner

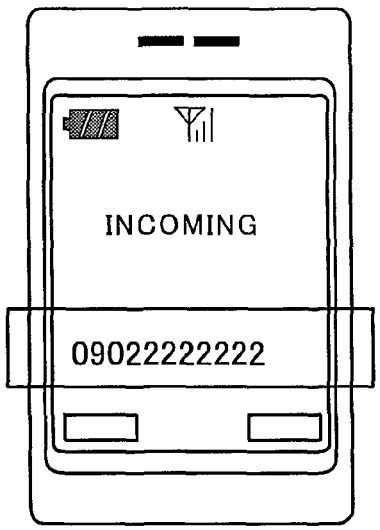
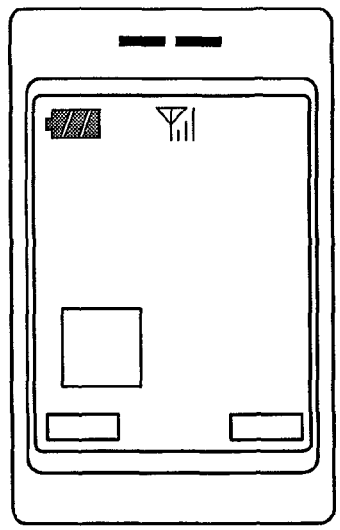
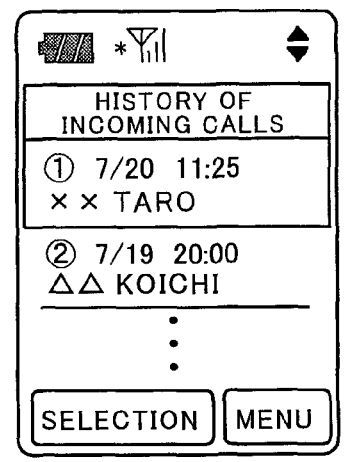
FIG.7A　　　　　FIG.7B　　　　　FIG.7C
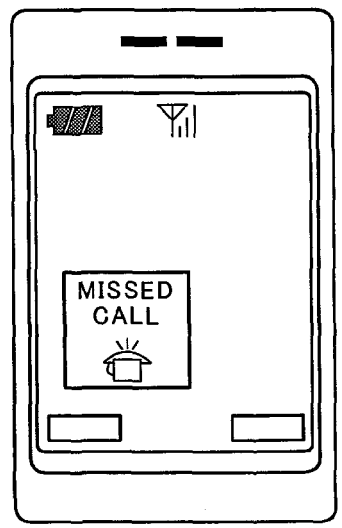
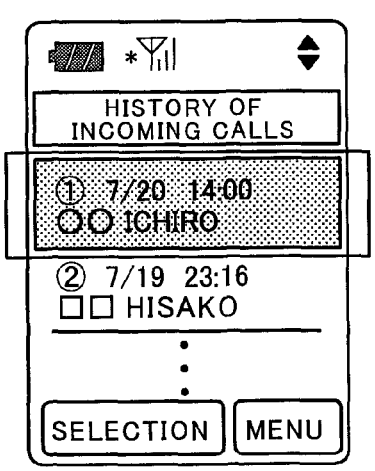
FIG.7D　　　　　FIG.7E

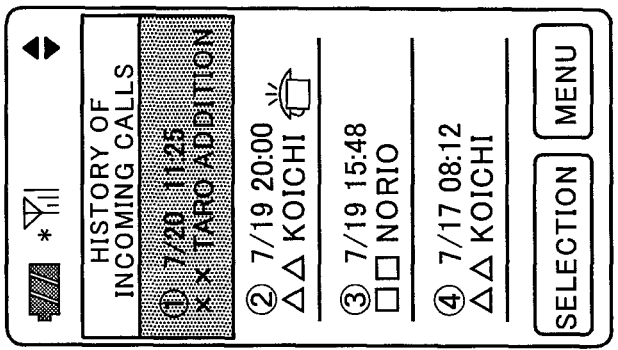
FIG.8C
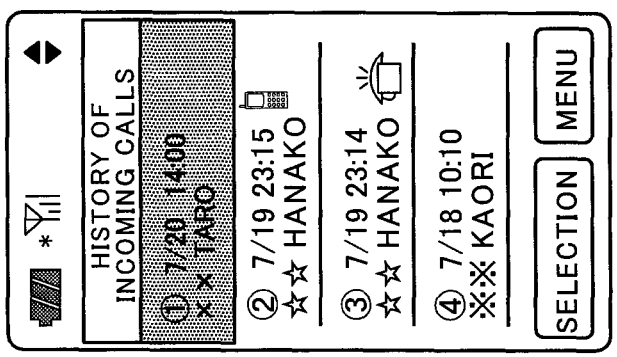
FIG.8B
FIG.8A

FIG.13A

TELEPHONE NUMBER A
09011111111
TELEPHONE NUMBER B
09022222222
MAIL ADDRESS A
aaa@OOO.ne.jp
MAIL ADDRESS B
bbb@OOO.ne.jp
NAME    AAA
KANA LETTERS  アアア
BIRTHDAY  1960/6/15

FIG.13B

TELEPHONE NUMBER
09011111111
MAIL ADDRESS
aaa@OOO.ne.jp
NAME    AAA
KANA LETTERS  アアア
BIRTHDAY  1960/6/15

FIG.13C

TELEPHONE NUMBER
09022222222
MAIL ADDRESS
bbb@OOO.ne.jp
NAME    AAA
KANA LETTERS  アアア
BIRTHDAY  1960/6/15

MULTI-MODE TERMINAL DEVICE

TECHNICAL FIELD

The present invention relates to a mobile terminal device, and more particularly, to a mobile terminal device having two telephone numbers.

BACKGROUND

Conventionally, in mobile terminal devices such as cellular telephones and the like, more advanced functions have been incorporated into the apparatuses, and it has been carried out that the apparatus has a plurality of pieces of terminal identification information, and uses these pieces of terminal identification information separately. For example, Patent Document 1 discloses a communication terminal apparatus that is provided with a plurality of pieces of terminal identification information and that is capable of making an optimal setting in accordance with the terminal identification information.

[Patent Document 1] Japanese Laid-Open Patent Publication No. 2006-14355

SUMMARY OF THE INVENTION

Each of many users of mobile terminal devices such as cellular telephones and the like shares a single mobile terminal device between business use and private use. In such users, there is a demand for separate use of different telephone numbers in business use and private use. Further, as well as private use, it is considered that the user uses the mobile terminal device for temporary use such as a communication number for an event, representative number of a circle and the like, and in such a case, there is a demand for setting of a different telephone number dedicated to temporary use.

In the above-mentioned conventional technique, for example, it is assumed that an external number and an extended number are distinguished to be set, and it is not intended to use different numbers separately between business use and private use or between normal use and temporary use. Accordingly, under present circumstances, such a mobile terminal device has not existed that has functions suitable for such separate use.

It is an object of the invention to provide a mobile terminal device having functions suitable for separate use between business use and private use, between normal use and temporary use, and the like.

A mobile terminal device of the invention is a mobile terminal device capable of placing and receiving calls by first identification information, and of placing and receiving calls by second identification information, and is characterized by having a mode changing section that changes a mode among a first mode, a second mode and a common mode, and an outgoing call control section which places a call by the first identification information in the first mode, places a call by the second identification information in the second mode, and places a call by either the first identification information or the second identification information in the common mode.

According to this configuration, the apparatus has two pieces of identification information, for example, a normal telephone number for a normal mode and an additional telephone number for an additional mode, and is thereby capable of exerting functions suitable for separate use between business use and private use, between normal use and temporary use and the like. Further, the apparatus has the common mode enabling use of both of the identification information, and is thereby capable of being applied also to the case without the need of separate use.

The mobile terminal device of the invention preferably has a first address book for the first mode, a second address book for the second mode, a display section that displays information in the mobile terminal device, and a control section that displays information of the address book in the display section corresponding to each mode.

In the mobile terminal device of the invention, the control section preferably displays only the information on the first address book when a call is received in the first mode, displays only the information on the second address book when a call is received in the second mode, and displays the information on the first address book and the second address book when a call is received in the common mode.

In the mobile terminal device of the invention, the control section preferably displays incoming call information in a display form different from a display form of an incoming call to the first identification information when a call is received at the second identification information in the first mode.

In the mobile terminal device of the invention, the outgoing call control section preferably places a call by the identification information corresponding to a type of the address book in placing the call from the address book in the common mode.

In the mobile terminal device of the invention, the outgoing call control section preferably places a call by the identification information corresponding to descriptions of a history of incoming and outgoing calls in placing the call from the history of incoming and outgoing calls in the common mode.

The mobile terminal device of the invention preferably has a power supply control section that sets a power supply OFF mode on an incoming call to the first identification information or the second identification information.

In the mobile terminal device of the invention, the power supply control section sets the power supply OFF mode corresponding to switching between the first mode, the second mode and the common mode.

BRIEF DESCRIPTION OF DRAWINGS

FIGS. 7(a) to (e) are diagrams illustrating display forms in incoming calls in the mobile terminal device according to the embodiment of the invention;

FIGS. 8(a) to (c) are diagrams illustrating display forms of histories of incoming calls in the mobile terminal device according to the embodiment of the invention;

FIGS. 13(a) to (c) are diagrams illustrating descriptions of a menu in the mobile terminal device according to the embodiment of the invention.

DETAILED DESCRIPTION OF THE PREFERRED EMBODIMENTS

Figure 1:
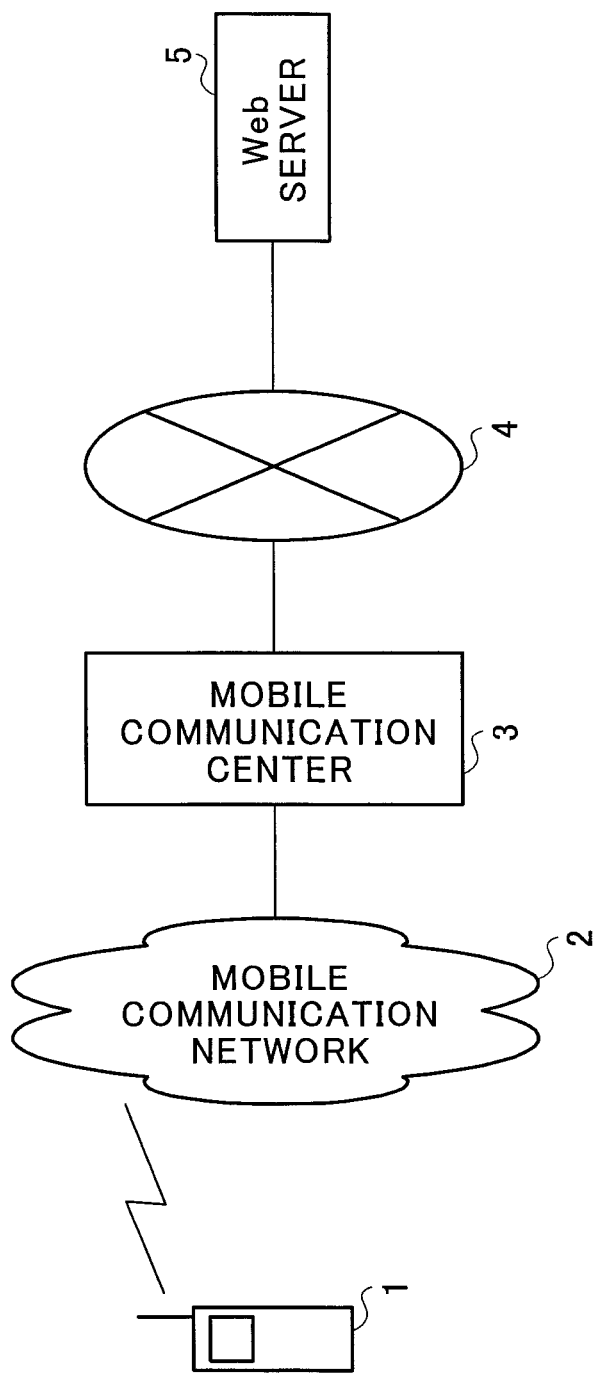
FIG. 1 is a diagram illustrating a schematic configuration of a system including a mobile terminal device according to an embodiment of the present invention.

FIG. 1 is a diagram illustrating a schematic configuration of a system including a mobile terminal device according to an embodiment of the present invention. The system as shown in FIG. 1 is mainly comprised of a mobile terminal 1, a mobile communication center 3 connected to the mobile terminal 1 via a mobile communication network 2, and a Web server 5 connected to the mobile communication center 3 via a network such as the Internet 4 and the like. Further, the mobile terminal 1 has an operating system (mobile OS), and a browser function, viewer function, JAM (Java Application Manger) and other functions operate on the mobile OS.

The mobile communication network 2 is a network between the mobile terminal 1 and mobile communication center 3. The mobile communication network 2 includes a mobile packet communication network, in addition to the normal mobile communication network. The mobile communication network center has, for example, an i-mode (registered trademark) server and the like, serves the gateway function for connecting the mobile communication network 2 and the Internet 4, and more specifically, has an information distribution function, mail transmission/reception function, mail storage function, customer management function, information provider management function, and information fee charging function. The network includes the Internet 4 and other networks such as, for example, LAN, WAN and the like.

Figure 2:
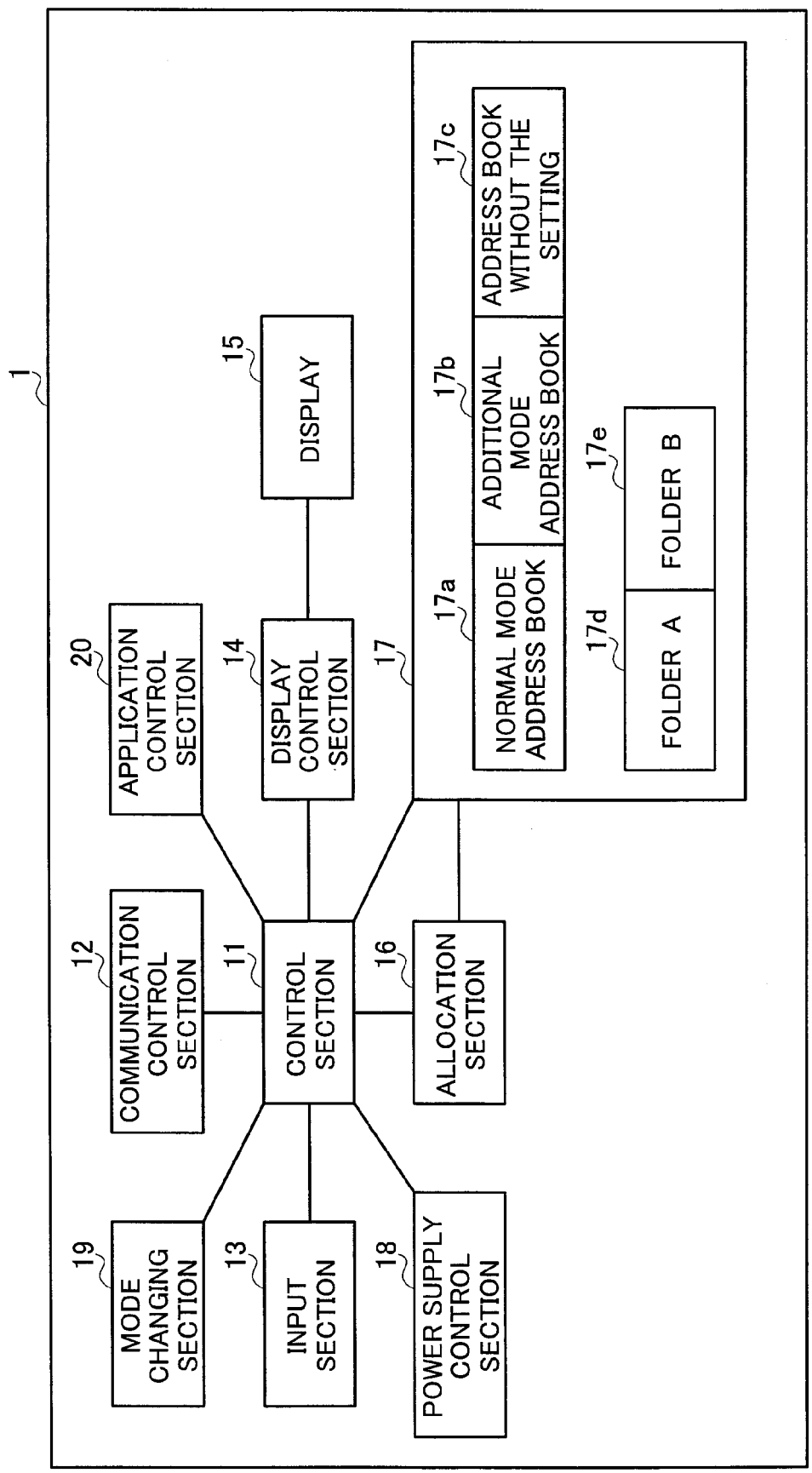
FIG. 2 is a block diagram illustrating a schematic configuration of the mobile terminal in the system as shown in FIG. 1.
Figure 3A:
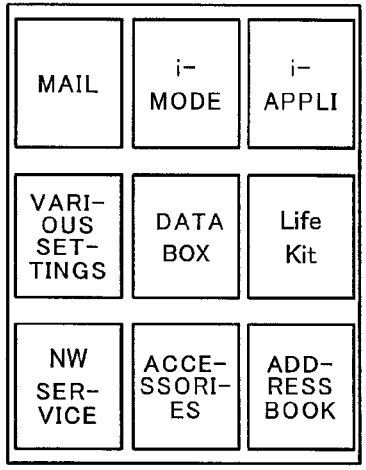
FIGS. 3(a) to (f) are diagrams to explain changes in screen in making a setting for a multi-number service.
Figure 3B:
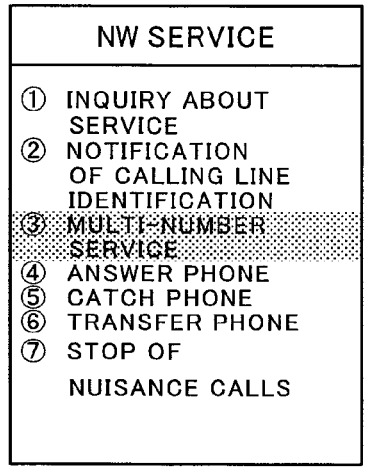
Figure 3C:
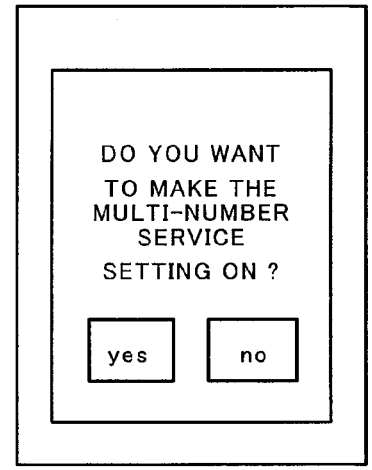
Figure 3D:
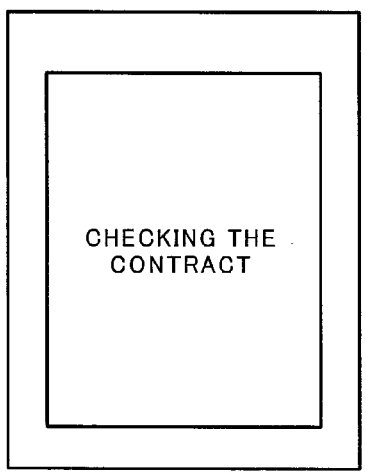
Figure 3E:
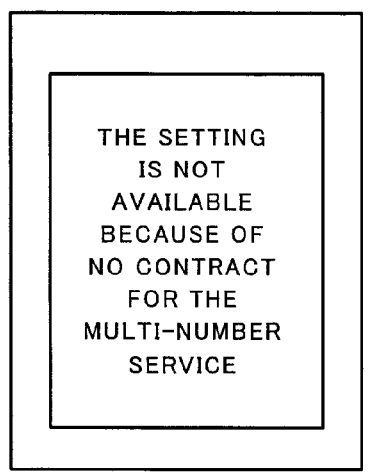
Figure 3F:
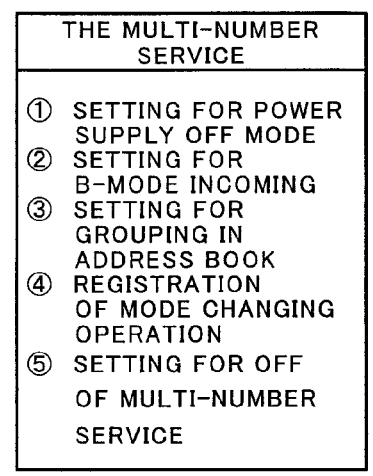

FIG. 2 is a block diagram illustrating a schematic configuration of the mobile terminal in the system as shown in FIG. 1. In addition, the configuration as shown in FIG. 2 is simplified to explain the invention, and is assumed to have components mounted on an ordinary mobile terminal.

The mobile terminal 1 is mainly comprised of a control section 11 that controls the entire apparatus, a communication control section 12 that controls wireless communication via an antenna, an input section 13 to input various kinds of information and data, a display control section 14 that controls display of various kinds of information and data in a display 15, an allocation section 16 that allocates data to a predetermined storage area corresponding to the mode, a storage section 17 that stores various kinds of data, a power supply control section 18 that switches the power supply ON/OFF corresponding to the mode, a mode changing section 19 that changes the mode among the normal mode that is the first mode, additional mode that is the second mode and the common mode in the mobile terminal 1, and an application control section 20 that controls startup of various kinds of applications.

The communication control section 12 controls wireless communication with another mobile terminal and another communication device, and the like, For example, the communication control section 12 places and receives calls to/from another mobile terminal and another communication device, and transmits and receives mail to/from another mobile terminal and another communication device. The communication control section 12 places a call from a telephone number corresponding to the mode. For example, the section 12 performs outgoing call control to place a call by the normal telephone number in the normal mode, place a call by the additional telephone number in the additional mode, and further, place a call by either the normal telephone number or the additional telephone number in the common mode.

The communication control section 12 transmits mail from the mobile terminal 1 in the normal mail address, while gaining access to a Web mail site to transmit a mail in the additional mail address. Meanwhile, the communication control section 12 receives a notice of reception when a Web mail is received at the additional mail address. Further, the communication control section 12 provides instructions to transfer the Web mail received at the additional mail address to the normal mail address.

In placing a call from the address book in the common mode, the communication control section 12 performs the outgoing call control to place a call by the identification information corresponding to a type of address book. In other words, when a call is placed in a state where the address book is displayed in the display 15 in the common mode, the call is placed by the identification information corresponding to the type of displayed address book (normal address book, additional address book and address book without setting). For example, a call is placed from the normal telephone number when the call is placed from the normal address book or the address book without setting, while being placed from the additional telephone number when the call is placed from the additional address book.

Meanwhile, in placing a call from a history of incoming and outgoing calls in the common mode, the communication control section 12 performs the outgoing call control to place a call by the identification information corresponding to descriptions of the history of incoming and outgoing calls. In other words, when a call is placed in a state where the history of incoming and outgoing calls is displayed in the display 15 in the common mode, the call is placed by the identification information corresponding to the descriptions (destination name, destination telephone number, source name, and source telephone number) of the displayed history of incoming and outgoing calls. For example, when a call is placed from the source name in the history of incoming and outgoing calls, the call is placed from the telephone number corresponding to the address book with which the source name is registered.

The input section 13 is a portion for a user to enter various inputs into the mobile terminal 1. By the input section 13, the user is capable of inputting various kinds of data, and performing operations such as ON/OFF of the power supply, mode change and the like.

The display control section 14 has the viewer function, and displays a variety of data and information in the display 15. Further, the display control section 14 formats the data and information in a predetermined display form to display. Furthermore, the display control section 14 displays the data and information selected corresponding to each mode of the mobile terminal 1, for example, the information of the address book in the display. For example, corresponding to the mode, the display control section 14 restricts the display of indication of an incoming call, history of incoming and outgoing calls, history of transmitted and received mails, pictogram for an unread message and the like. In other words, the display control section 14 displays only the information on the normal address book when a call is received in the normal mode, displays only the information on the additional address book when a call is received in the additional mode, and displays the information on the normal address book and the additional address book when a call is received in the common mode.

More specifically, when the mobile terminal 1 is set for some mode (for example, the normal mode), the display control section 14 displays the information of the address book registered with the mode or the common mode in the display 15. In other words, when the terminal 1 is set for some mode, the display control section 14 does not display the information of the address book of the other mode (for example, the additional mode) in the display 15, or changes the display form and restricts to the minimum information to display. For example, when a call is received at the additional telephone number in the normal mode, the display control section 14 displays in the display 15 the incoming call information in a display form different from that of a call received at the normal telephone number.

The allocation section 16 allocates mails received at the mobile terminal 1 to folders A and B, 17*d* and 17*e*, of the storage section 17 for each mode. For example, the allocation section 16 allocates a mail sent to the address for the normal mode to the folder A17*d*, while allocating a mail sent to the address for the additional mode to the folder B17*e*. In addition, in this embodiment, the mail to the address for the additional mode is a notice of reception of a Web mail or SMS mail (short mail).

The storage section 17 includes the normal mode address book 17*a* with which are registered objects set for the normal mode, additional mode address book 17*b* with which registered are objects set for the normal mode, address book 17*c* without setting with which are registered objects without setting, folder A17*d* for storing mails sent to the address set for the normal mode, and folder B17*e* for storing mails sent to the address set for the additional mode.

The power supply control section 18 sets a power supply OFF mode on an incoming call of the normal identification information or additional identification information. Herein, the power supply OFF mode is giving a response for power supply OFF while switching OFF the power supply in a virtual manner as a power supply OFF mode. For example, when the normal telephone number is set for the power supply OFF mode, the power supply control section 18 sets the OFF mode on the power supply for a call received at the normal telephone number. The power supply OFF mode can be realized by setting the existing public mode or driving mode, for example. In this state, when a call is placed to the normal telephone number, the mobile terminal 1 performs the out-of-service operation (for example, announcement of OFF of power supply or out-of-service is made), and the call cannot be established.

The power supply control section 18 sets the power supply OFF mode corresponding to switching between the normal mode, additional mode and common mode. When the power supply OFF mode is set in each mode, the power supply OFF mode can be identified on the screen. It is possible to identify the power supply OFF mode on the normal telephone number in the normal mode, identify the power supply OFF mode on the additional telephone number in the additional mode, and identify the power supply OFF mode on the normal telephone number and additional telephone number in the common mode. Accordingly, in this case, the display control section 14 displays an indication of the power supply OFF mode (for example, an indication showing out-of-service) in the display 15 corresponding to the mode.

The mode changing section 19 changes the mode among the normal mode, additional mode and common mode by an input of the user. In addition, for a setting of mode for using a plurality of telephone numbers and a setting of the power supply OFF mode, since such settings are performed on the network side, the mobile terminal 1 requests the setting to the mobile communication center 3 via the mobile communication network 2, and the mobile communication center 3 makes the mode setting.

The application control section 20 executes an application program created in an application language (for example, Java (registered trademark) language) according to an instruction of the control section 11. The application control section 20 starts up the application between the mobile terminal 1 and the mobile communication center 3 when necessary.

Described next are the functions of the mobile terminal 1 with the above-mentioned configuration.

In the service using the above-mentioned mobile terminal 1 i.e. the service (herein, referred to as a multi-number service) enabling a plurality of telephone numbers to be used, the network side makes a setting for enabling/disabling the service. Accordingly, only when the setting for enabling the service is made, the functions on the multi-number service are enabled.

In the case of making a setting (setting ON) of the multi-number service, for example, a network service (NW service) is selected on the menu screen of the mobile terminal 1 as shown in FIG. 3(*a*). When the NW service is selected, the mobile terminal 1 communicates with the mobile communication center 3 via the communication control section 12. Then, the screen as shown in FIG. 3(*b*) is displayed. When the multi-number service is selected on the screen, the screen as shown in FIG. 3(*c*) is displayed. In addition, when accessing the multi-number, entry of a password is requested, and the password is checked.

When "Yes" is selected on the screen as shown in FIG. 3(*c*), through the screen as shown in FIG. 3(*d*), the screen is changed to the screen of FIG. 3(*f*) when the user has the contract to receive the service, while being changed to the screen of FIG. 3(*e*) when the user does not have the contract to receive the service. Meanwhile, when "No" is selected on the screen as shown in FIG. 3(*c*), the screen returns to the screen as shown in FIG. 3(*b*). Further, in the case where the setting of the multi-number service has already been made, when the multi-number service is selected on the screen as shown in FIG. 3(*b*), the screen is changed to the screen as shown in FIG. 3(*f*).

In the case of receiving a call given a service code specific to the multi-number service when the service is not set yet, such a message pops up that "the multi-number service has not been set. Do you want to make the setting ON?" after finish of the call. Meanwhile, when the service is set, in the case of receiving a call without the contract for the service i.e. a call without the service code specific to the service, such a message pops up that "the setting of multi-number service is made OFF because of no contract for the multi-number service", and the setting is made OFF. In addition, when the setting is made OFF, beforehand divided folders and groups are left unchanged. Further, also when a card for the terminal, e.g. a FOMA (registered trademark) card is attached or removed to/from the main body, the previous setting information can be transferred without change.

When the setting of multi-number service is made ON, it is possible to exert the functions suitable for separate use between business use and private use, between normal use and temporary use, and the like. For example, requests are satisfied to use two telephone numbers and mail addresses separately according to the usage, hide the existence of one telephone number and mail address and the like.

In the service, the mobile terminal 1 has three modes, i.e. common mode, normal mode and additional mode. The common mode is a mode enabling the normal telephone number (normal mail address) and the additional telephone number (additional mail address) to be used separately. The normal mode is a mode used in the normal telephone number (normal mail address). In this normal mode, it is not recognized on the screen that the setting of multi-number service is OFF. In other words, in order that the existence of the additional mode is not recognized, the display control section 14 does not display the information related to the additional mode in the display 15. The additional mode is a mode used in the additional telephone number (additional mail address).

In the mobile terminal 1, when the mode is changed, in other words, when the user performs the operation of changing the mode in the input section 13, the mode changing section 19 changes the mode among the common mode, normal mode and additional mode. In this case, the display control section 14 displays a pop-up message for asking a mode to shift in the display 15. Further, for the operation of changing the mode, in order to keep others from knowing the operation method, the user is capable of registering the operation at a user's discretion.

For the address book, the mobile terminal 1 has at least the normal address book for the normal telephone number and the additional address book for the additional telephone number. In this embodiment, the terminal 1 has in the storage section 17 the normal address book 17a, additional address book 17b, and address book 17c without setting. Objects for which a call is placed and received in the normal telephone number are registered with the normal address book 17a, objects for which a call is placed and received in the additional telephone number are registered with the additional address book 17b, and objects without the setting for using the normal telephone number or the additional telephone number are registered with the address book 17c without setting.

Figure 4A:
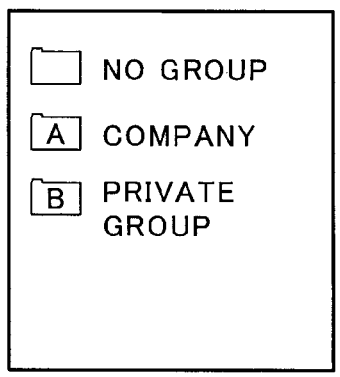
FIGS. 4(a) to (c) are diagrams illustrating display forms of address books in the mobile terminal device according to the embodiment of the invention.
Figure 4B:
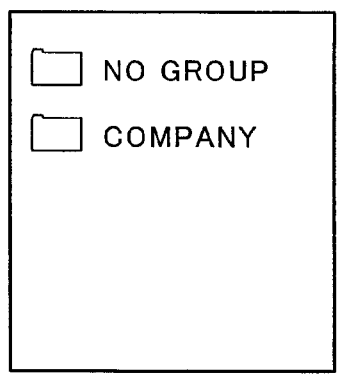
Figure 4C:
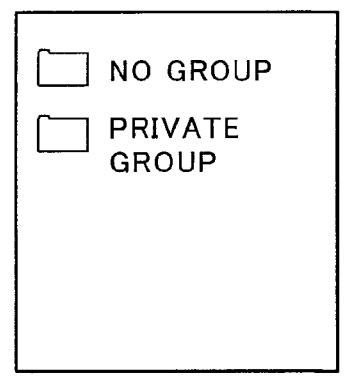

These address books 17a to 17c are displayed according to the mode by the display control section 14 as shown in FIG. 4. In other words, in the common mode, as shown in FIG. 4(a), displayed are all of the address book without the setting, normal address book (shown by A in FIG. 4), and the additional address book (shown by B in FIG. 4). In the normal mode, as shown in FIG. 4(b), displayed are the address book without the setting and the normal address book. In the additional mode, as shown in FIG. 4(c), displayed are the address book without the setting and the additional address book.

The mobile terminal 1 has the common mode, normal mode and additional mode as described above, displays only the information on the normal address book when a call is received in the normal mode, displays only the information on the additional address book when a call is received in the additional mode, and displays the information on the normal address book and the additional address book when a call is received in the common mode. For example, when the normal mode is set, the terminal 1 does not display the information of the address book of the additional mode in the display 15. By this means, it is possible not to display a specific partner in the history of incoming and outgoing calls. Alternately, when the normal mode is set, the terminal 1 changes the display form, and restricts the information of the address book of the additional mode to the minimum information to display. By this means, it is made possible to cause the user to recognize that the incoming call is to the telephone number corresponding to the mode different from the current mode (such a telephone number exists in the address book corresponding to the other mode.)

Figure 5:
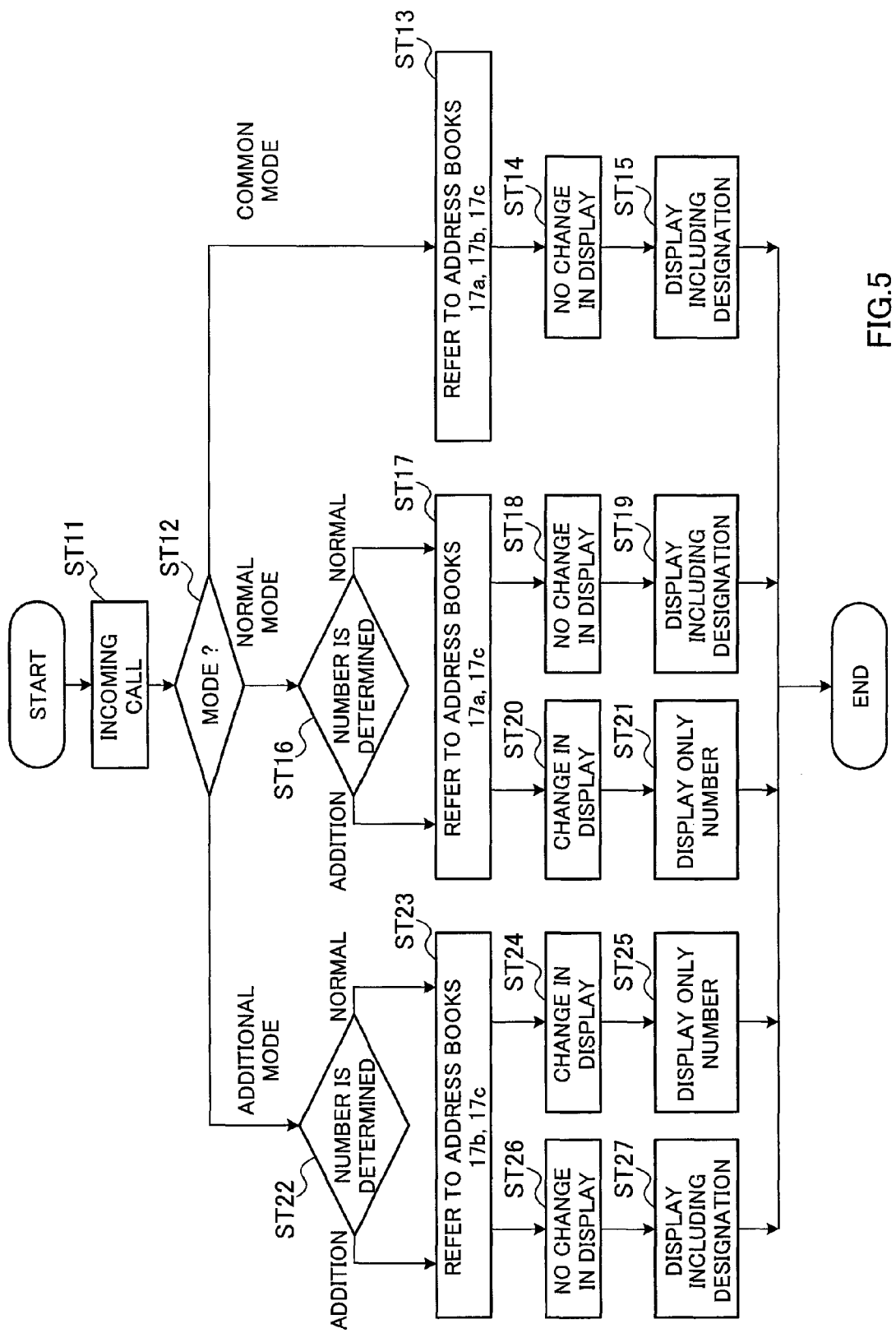
FIG. 5 is a flow diagram to explain display forms in incoming calls in the mobile terminal device according to the embodiment of the invention.
Figure 6A:
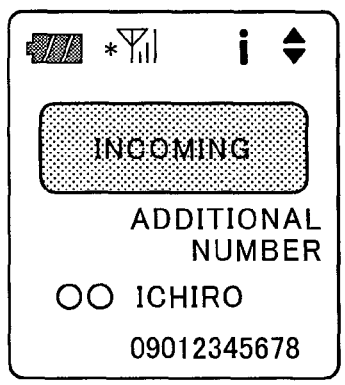
FIGS. 6(a) to (c) are diagrams illustrating display forms in incoming calls in the mobile terminal device according to the embodiment of the invention.

FIG. 5 is a flow diagram to explain display forms in incoming calls in the mobile terminal device according to the embodiment of the invention. When a call is received at the mobile terminal 1 in a state where the multi-number service is set (ST11), the mobile terminal 1 determines a mode that is currently set (ST12). When the mode is the common mode, the control section 11 refers to the address book in the storage section 17 (ST13). At this point, since the mode is the common mode, the control section 11 refers to all of the normal address book 17a, additional address book 17b and address book 17c without the setting. Then, when a telephone number of the originating side is registered with the address book, the telephone number is subjected to a reverse search, the name and designation are extracted, and the display control section 14 does not change the display form (ST14), and displays the telephone number, name and designation in the display 15 (ST15). For example, in the common mode, when a call is received from an object for which a call is placed and received in the additional mode, as shown in FIG. 6(a), the name and telephone number reversely searched from the additional address book are displayed in the display 15. At this point, the display 15 also displays an indication of the additional mode ("additional number" in FIG. 6(a)).

Figure 6B:
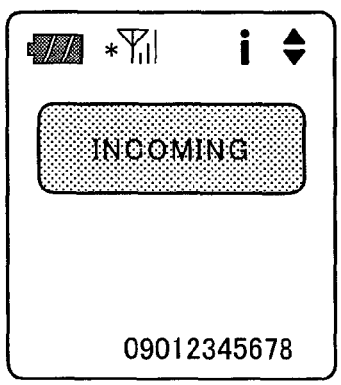

When the current mode is the normal mode, the telephone number is determined (ST16), and when the incoming call is to the normal telephone number, the control section 11 refers to the address book in the storage section 17 (ST17). At this point, since the mode is the normal mode, the control section 11 refers to the normal address book 17a and address book 17c without the setting. Then, when a telephone number of the originating side is registered with the normal address book, the telephone number is subjected to a reverse search, the name and designation are extracted, and the display control section 14 does not change the display form (ST18), and displays the telephone number, name and designation in the display 15. Meanwhile, when the incoming call is to the additional telephone number, similarly, the control section 11 refers to the address book in the storage section 17 (ST17). At this point, since the mode is the normal mode, the control section 11 refers to the normal address book 17a and address book 17c without the setting. In this case, since the call is received at the telephone number of the additional mode in the normal mode, the display control section 14 changes the display form of the additional telephone number (for example, changes the color) (ST20), and displays only the telephone number in the display 15 (ST21). For example, in the normal mode, when a call is received from an object for which a call is placed and received in the additional mode, as shown in FIG. 6(b), the telephone number is displayed in the display 15 with the display form changed.

Figure 6C:

When the current mode is the additional mode, the telephone number is determined (ST22), and when the incoming call is to the normal telephone number, the control section 11 refers to the address book in the storage section 17 (ST23). At this point, since the mode is the additional mode, the control section 11 refers to the additional address book 17b and address book 17c without the setting. In this case, since the call is received at the telephone number of the normal mode in the additional mode, the display control section 14 changes the display form of the normal telephone number (for example, changes the color) (ST24), and displays only the telephone number in the display 15 (ST25). Meanwhile, when the incoming call is to the additional telephone number, similarly, the control section 11 refers to the address book in the storage section 17 (ST23). At this point, since the mode is the additional mode, the control section 11 refers to the additional address book 17b and address book 17c without the setting. Then, when a telephone number of the originating side is registered with the additional address book, the telephone number is subjected to a reverse search, the name and designation are extracted, and the display control section 14 does not change the display form (ST26), and displays the telephone number, name and designation in the display 15 (ST27). For example, in the additional mode, when a call is received from an object for which a call is placed and received in the additional mode, as shown in FIG. 6(c), the telephone number, name and designation are displayed in the display 15 without changing the display form of the telephone number.

As described above, in some mode except the common mode, when a call is received at the telephone number for the other mode except the common mode, the information of the address book is not displayed, display of missed call is not performed, and the call is not recorded in the history of incoming and outgoing calls. Meanwhile, in some mode except the common mode, when a call is received at the telephone number for the same mode except the common mode, the information of the address book is included to be displayed, display of missed call is performed, and the call is recorded in the history of incoming and outgoing calls. For example, as shown in FIG. 7, in the case where the mobile terminal 1 is set for the normal mode, when a call is received at the additional telephone number, as shown in FIG. 7(a), the terminal 1 sounds and/or moves for the incoming call, but the information of the address book is not displayed. Instead, by changing the display color of the telephone number or the like, the display form is changed. Then, as shown in FIG. 7(b), display of missed call is not performed, and as shown in FIG. 7(c), the call is not recorded in the history of incoming and outgoing calls. Meanwhile, in the case where the mobile terminal 1 is set for the normal mode, when a call is received at the normal telephone number, the information of the address book is displayed in the sound and/or motion for the incoming call. Then, as shown in FIG. 7(d), display of missed call is performed, and as shown in FIG. 7(e), the call is recorded in the history of incoming and outgoing calls.

In other words, for the history of incoming calls, in the common mode, as shown in FIG. 8(a), the display 15 displays both a call received at the normal telephone number and a call received at the additional telephone number. In this case, the call at the additional telephone number is displayed to be identified (display of "addition"). In the normal mode, as shown in FIG. 8(b), only calls received at the normal telephone number are displayed, without displaying calls received at the additional telephone number. In the additional mode, as shown in FIG. 8(c), only calls received at the additional telephone number are displayed, without displaying calls received at the normal telephone number. In this case, the calls at the additional telephone number are displayed to be identified (display of "addition").

In the multi-number service, when a call is placed to a person registered with the address book, in other words, when the address book is displayed and a displayed object is selected to place a call, the call is placed by the telephone number associated with the address book. In other words, the call is placed according to the mode in the case of no setting, while being placed from the normal telephone number in the case of the normal mode, or being placed from the additional telephone number in the case of the additional mode. In addition, when a call is placed by directly inputting a number to dial in the input section 13, the telephone number can be selected for each call in the common mode, the normal telephone number is used to call in the normal mode, and the additional telephone number is used to call in the additional mode. Further, for calling from the history of incoming and outgoing calls, a telephone number (the normal telephone number or additional telephone number) used in placing (receiving) a call is used to call.

In the multi-number service, as well as the normal mail address, an additional mail address is given. This additional mail address is a mail address for Web mail. When a mail is transmitted to the additional mail address, the Web server 5 transmits a notice of reception by i-mode (registered trademark) mail via the mobile communication center 3. Further, SMS (short mail) can be received at the additional mail address.

Figure 9:
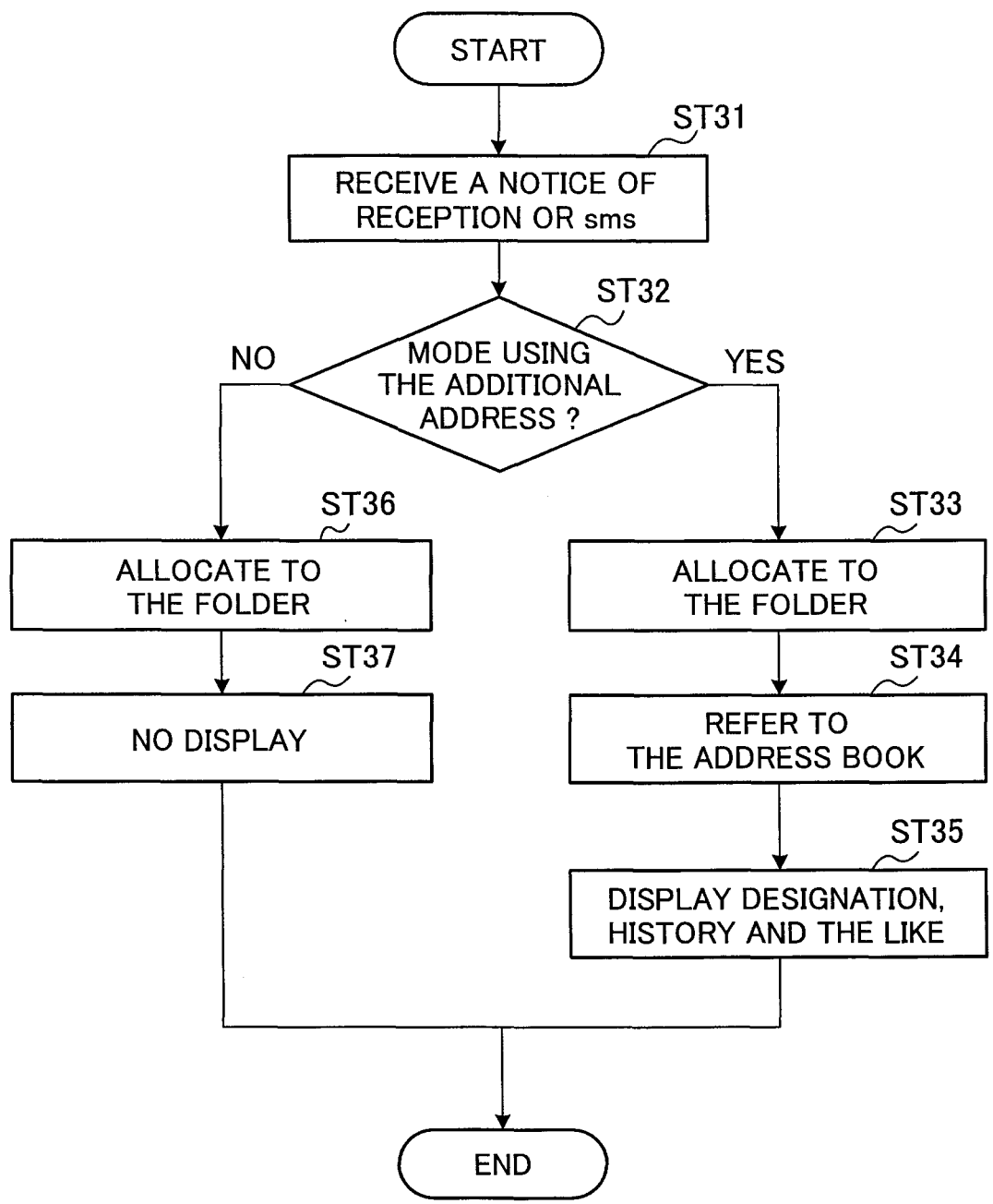
FIG. 9 is a flow diagram to explain reception of an e-mail in the multi-number service.

FIG. 9 is a flow diagram to explain reception of an e-mail in the multi-number service. When receiving a notice of reception or SMS to the additional telephone number (ST31), the mobile terminal 1 determines a current mode. For example, it is determined whether the current mode is the additional mode (ST32). Then, when the mobile terminal 1 is set for the additional mode, the mail of the notice of reception and SMS are allocated to the folder B17e of the storage section 17 (ST33). Then, at the time of displaying the Web mail in the display 15, the additional address book is referred for the mail address displayed on the browser (ST34), and when the address is found, the name of the address book, designation, history and the like are displayed on the browser (ST35). In addition, the address book to be referred to is all of the address books 17a, 17b and 17c in the common mode, while being the address book 17c without the setting and the additional address book 17b in the additional mode.

When the mobile terminal 1 is set for the normal mode, the mail of the notice of reception and SMS are allocated to the folder B17e of the storage section 17 (ST36). In this case, the display control section 14 does not display the folder B17e in the display 15. Further, in order to keep the reception from being known, the display control section 14 does not display a pictogram for an unread mail (ST37).

Figure 10A:
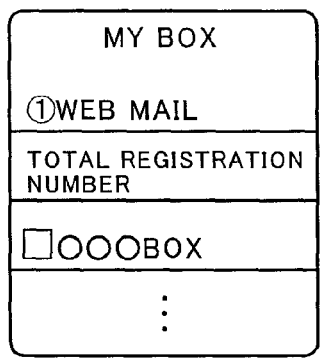
FIGS. 10(a) to (e) are diagrams showing display screens for Web mails in the mobile terminal device according to the embodiment of the invention.
Figure 10B:
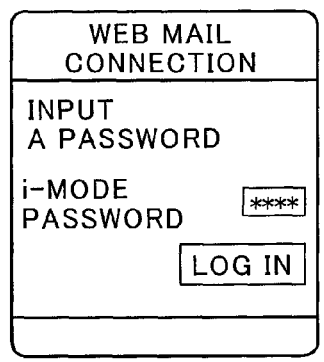
Figure 10C:
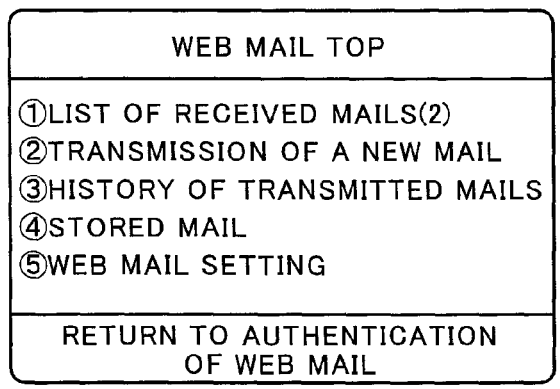
Figure 10D:
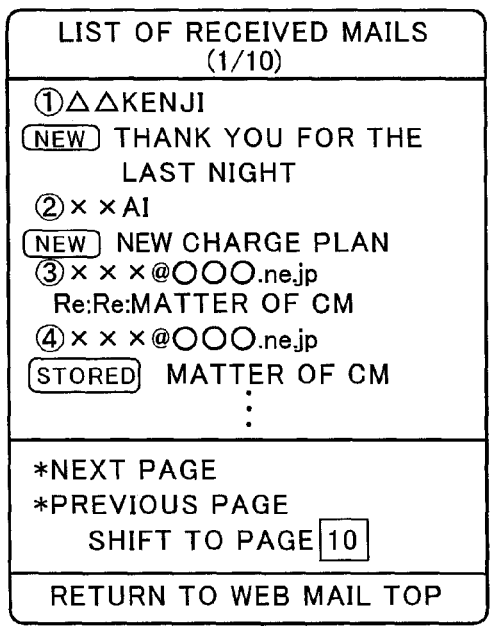
Figure 10E:
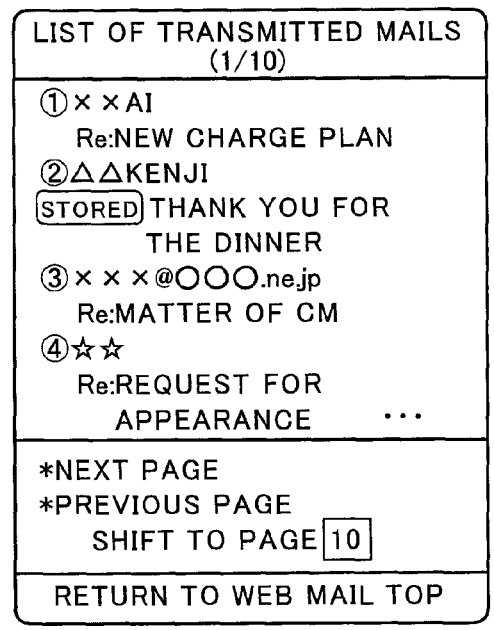

For the Web mail, display is made as shown in FIGS. 10(a) to (e). In other words, when a Web mail is selected on the screen as shown in FIG. 10(a), the screen changes as shown in FIG. 10(b), and when a password is input on the screen to log in, the screen as shown in FIG. 10(c) is displayed. Then, for example, when a list of received mails is selected on the screen, the screen as shown in FIG. 10(d) is displayed, and when a list of transmitted mails is selected, the screen as shown in FIG. 10(e) is displayed.

Further, in mail transmission, for the normal mail address, the mobile terminal 1 is capable of transmitting the mail, but for the additional mail address, since the mail is a Web mail, the mobile terminal 1 gains access to the Web server from the communication control section 12 via the mobile communication center 3 to transmit a mail. Accordingly, on the menu screen of the mobile terminal 1, a menu enabling access to the Web mail site is provided in the common mode and additional mode. This menu is formed by embedding the URL. For the SMS, since the mail can be transmitted also to the additional telephone number, it is possible to transmit the mail in association with the address book in the common mode, to transmit the mail from the normal telephone number in the normal mode, and to transmit the mail from the additional telephone number in the additional mode.

In the mobile terminal 1, in the case where a Web mail is not displayed completely, the Web mail is transferred to the telephone number of the mode using the i-mode mail when the Web mail is received. By this means, even when the Web mail is not displayed completely, the Web mail can be displayed completely as an I-mode mail. Further, according to such procedures, during the use of a plurality of mail addresses, when any one of the mail addresses is restricted on use, it is possible to use both the mail addresses irrespective of restriction on function.

Figure 11:
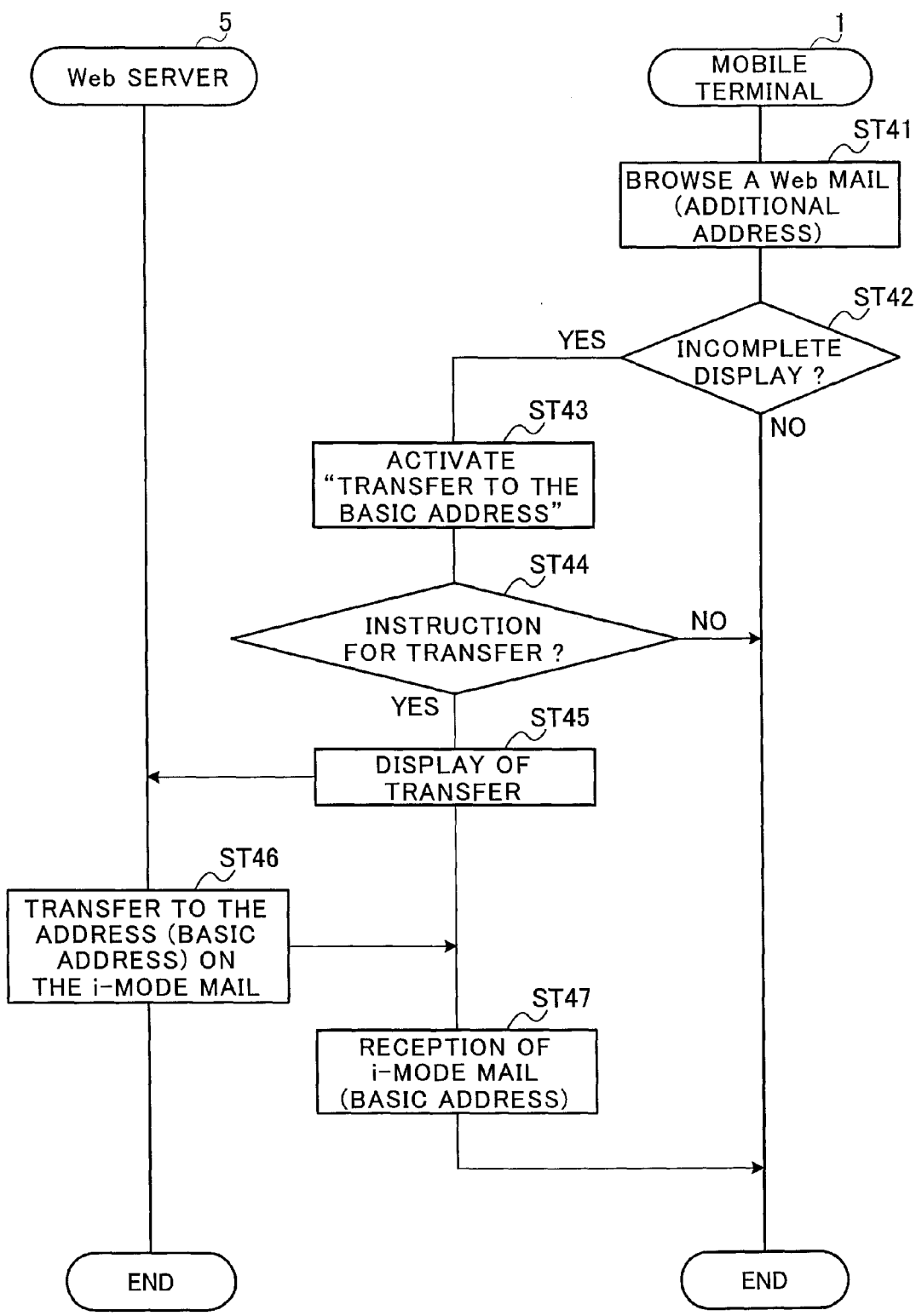
FIG. 11 is a flow diagram illustrating procedures for transferring a Web mail to an i-mode mail in the mobile terminal device according to the embodiment of the invention.

FIG. 11 is a flow diagram illustrating procedures for transferring a Web mail to an i-mode mail. The mobile terminal 1 receives a notice of reception by i-mode mail, and browses the Web mail (ST41). When the Web mail is not displayed completely in browsing the mail (ST42), the Web mail is transferred to the normal mail address. In other words, "transfer to the basic address (normal mail address)" is activated (ST43) to instruct transfer (ST44, ST45). By this means, the Web server 5 transfers the Web mail to the normal mail address for i-mode mail (ST46). The mobile terminal 1 receives the Web mail as an I-mode mail (ST47). Then, the Web mail is displayed in a perfect form in the display 15.

In the multi-number service, when the common mode is set, it is possible to set one of the telephone numbers for the power supply OFF mode using the power supply control section 18. Further, it is possible to set the additional telephone number for the power supply OFF mode in the normal mode, and it is possible to set the normal telephone number for the power supply OFF mode in the additional mode. In this way, since the operation of the power supply OFF mode is performed in association with the mode, it is possible to cope with cases that the user does not want to respond to an incoming call for the mode different from the current mode and the like. For example, when different telephone numbers are used separately between business use and private use, it is possible to prevent a business call from reaching during the private time. In addition, this power supply OFF mode can be set in the mobile terminal 1 with ease for each telephone number as in the public mode (driving mode). For example, by displaying "out-of-service" and the like, the power supply OFF mode can be confirmed in the display 15. In this case, it is possible to confirm the OFF mode on the normal telephone number (basic number) and the additional telephone number in the common mode, to confirm the OFF mode on the normal telephone number (basic number) in the normal mode, and to confirm the OFF mode on the additional telephone number in the additional mode.

Figure 12:
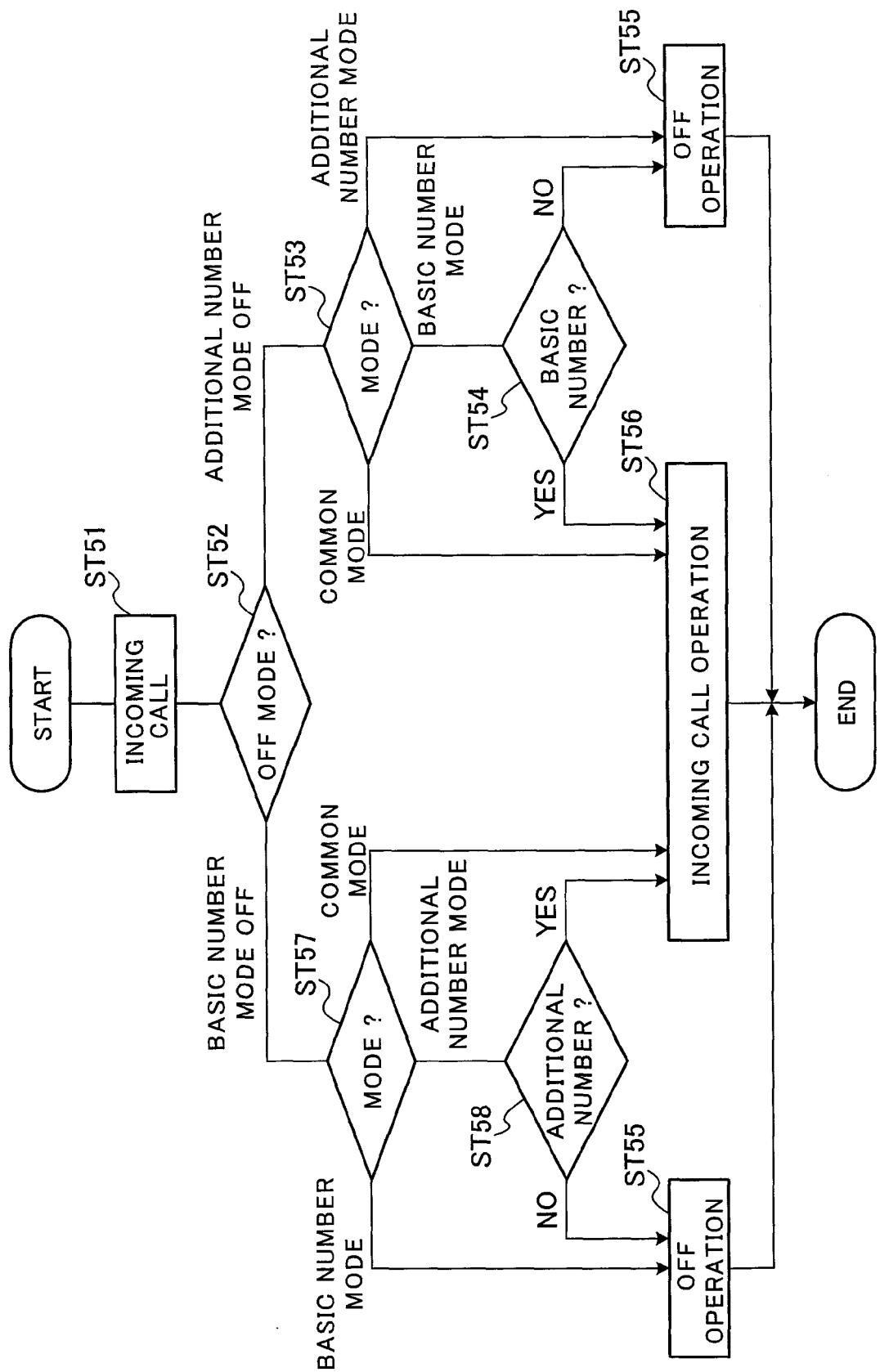
FIG. 12 is a flow diagram to explain the operation in power supply OFF mode in the mobile terminal device according to the embodiment of the invention.

FIG. 12 is a flow diagram to explain the operation in the power supply OFF mode in the mobile terminal device according to the embodiment of the invention. When a call is received at the mobile terminal 1 in the common mode (ST51), it is determined whether the power supply OFF mode is set (ST52). When the power supply OFF mode is set on the additional telephone number of the additional mode (additional number mode), the current mode of the mobile terminal 1 is determined (ST53). When the current mode is the additional mode, the power supply OFF operation is performed (ST55). In other words, display of out-of-service is performed in the display 15. When the current mode is the normal mode (basic number mode), it is determined whether the call is to the basic number (normal telephone number) (ST45). When the call is not to the basic number, since the call is to the additional number, the power supply OFF operation is performed (ST55). In this case, display of out-of-service is not performed in the display 15. Meanwhile, when the call is to the basic number, the incoming-call operation is performed (ST56). Further, when the mobile terminal 1 is in the common mode, the incoming-call operation is performed (ST56).

When the power supply OFF mode is set on the normal telephone number of the normal mode (basic number mode), the current mode of the mobile terminal 1 is determined (ST57). Then, when the current mode is the normal mode, the power supply OFF operation is performed (ST55). In other words, display of out-of-service is performed in the display 15. When the current mode is the additional mode (additional number mode), it is determined whether the call is to the additional number (additional telephone number) (ST58). When the call is not to the additional number, since the call is to the basic number, the power supply OFF operation is performed (ST55). In this case, display of out-of-service is not performed in the display 15. Meanwhile, when the call is to the additional number, the incoming-call operation is performed (ST56). Further, when the mobile terminal 1 is in the common mode, the incoming-call operation is performed (ST56).

Thus, the mobile terminal device according to this embodiment has the normal mode, additional mode and common mode, has the normal telephone number for the normal mode and the additional telephone number for the additional mode, further has the normal address book for the normal telephone number, the additional address book for the additional number, the display section for displaying the information in the mobile terminal device, and the control section for causing the display section to display the information of the address book corresponding to the mode in the mobile terminal device, and is thereby capable of exerting the functions suitable for separate use between business use and private use, between normal use and temporary use, and the like.

Further, in the mobile terminal 1, it is possible to set a standby screen for the common mode in the common mode, to set a standby screen for the normal mode in the normal mode, and to set a standby screen for the additional mode in the additional mode. Furthermore, in the mobile terminal 1, incoming-call settings such as ring alert, incoming call screen, vibration sound/motion pattern and the like can be set for each of respective calls at the normal telephone number and the additional telephone number. In other words, it is possible to make respective incoming call settings for the normal mode and the additional mode in the common mode, to make incoming call settings for the normal mode in the normal mode, and to make incoming call settings for the additional mode in the additional mode.

Moreover, in the mobile terminal 1, it is possible to set an answer phone and transfer phone on each of the normal telephone number and additional telephone number. It is possible to make such settings on both of the normal telephone number and additional telephone number in the common mode, to make such settings on the normal telephone number in the normal mode, and to make such settings on the additional telephone number in the additional mode. In addition, for display of an icon for notifying of an answer phone, for example, notification of the number of answer phones for each of the normal telephone number and additional telephone number is displayed to enable the notification to be recognized by icon in the common mode, notification of the number of answer phones to the normal telephone number is only displayed in the normal mode, and notification of the number of answer phones to the additional telephone number is only displayed in the additional mode.

Further, descriptions of the menu can be set on the additional telephone number and additional mail address. In the common mode, as shown in FIG. 13(a), the telephone numbers and mail addresses of both modes are displayed in the display 15. In the normal mode, as shown in FIG. 13(b), the normal telephone number and normal mail address are displayed in the display 15. In the additional mode, as shown in FIG. 13(c), the additional telephone number and additional mail address are displayed in the display 15.

The mobile terminal device of the invention is a mobile terminal device capable of placing and receiving calls by the first identification information, and of placing and receiving calls by the second identification information, has the mode changing section that changes a mode among the first mode, the second mode and the common mode, and the outgoing call control section which places a call by the first identification information in the first mode, places a call by the second identification information in the second mode, and places a call by either the first identification information or the second identification information in the common mode, and is thereby capable of exerting the functions suitable for separate use between business use and private use, between normal use and temporary use and the like.

The invention is not limited to the configuration described in the above-mentioned embodiment, and the display form on the screen and the like are capable of being carried into practice with modifications thereof as appropriate without departing from the scope of the invention. The above-mentioned embodiment describes the case of setting a plurality of address books individually, but the invention may be configured in that objects for the normal mode and objects for the additional mode are registered with a single address book, and that identifiers to distinguish between the normal mode objects and additional mode objects are given to virtually generate the address book for the normal mode and the address book for the additional mode. Moreover, the embodiment is capable of being carried into practice with modifications thereof without departing from the scope of the invention.

The invention claimed is:

1. A mobile terminal device capable of placing and receiving calls by first identification information, and of placing and receiving calls by second identification information, comprising:
   a mode changing section that changes a mode among a first mode in which calls are placed and received using the first identification information, a second mode in which calls are placed and received using the second identification information and a common mode in which the first identification information or the second identification information can be selectively used; and
   a control section that performs control so as to cause a display section to perform display in a display mode corresponding to the first mode when an incoming call is received to the first identification information in the first mode and cause the display section to perform display in a display mode different from the display mode corresponding to the first mode when an incoming call is received to the first identification information in the second mode.

2. The mobile terminal device according to claim 1, further comprising:
   a first address book for the first identification information; and
   a second address book for the second identification information,
   wherein the control section performs control so as to display information on the first address book on the display section when an incoming call is received to the first identification information in the first mode and so as not to display information on the first address book on the display section or so as to display the information on the first address book restricted to minimum information on the display section when an incoming call is received to the first identification information in the second mode.

3. The mobile terminal device according to claim 2, wherein the control section performs control so as to display the minimum information so that it is possible to identify that an incoming call is received to the first identification information not in the first mode but in the second mode.

4. The mobile terminal device according to claim 3, wherein the control section changes the display color of the minimum information when an incoming call is received to the first identification information in the first mode.

5. The mobile terminal device according to claim 2, wherein the minimum information is a telephone number of the transmitting side corresponding to the first identification information.

6. The mobile terminal device according to claim 1, wherein the control section performs control so as to perform display of absence on the display section when an incoming call is received to the first identification information in the first mode and so as not to perform display of absence on the display section when an incoming call is received to the first identification information in the second mode.

7. The mobile terminal device according to claim 1, wherein the control section performs control so as to display, when an incoming call is received to the first identification information in the first mode, the incoming call on the display section as a history of incoming calls for the first mode and so as not to display, when an incoming call is received to the first identification information in the second mode, the incoming call on the display section as a history of incoming calls for the second mode.

8. The mobile terminal device according to claim 1, wherein the control section performs control so as to display, when an automatic telephone message is recorded in the first identification information in the first mode, a report of the number of automatic telephone messages directed to the first identification information on the display section and so as not to display, when an automatic telephone message is recorded in the first identification information in the second mode, the report of the number of automatic telephone messages directed to the first identification information on the display section and so as not to display the report of the number of automatic telephone messages directed to the second identification information on the display section.

* * * * *